ELECTROPHORETIC IMAGING PROCESS INCLUDING APPLICATION OF DYNAMIC STRESS ON THE PARTICLE SUSPENSION

Original Filed Oct. 3, 1968

United States Patent Office

Re. 28,260
Reissued Dec. 3, 1974

28,260

ELECTROPHORETIC IMAGING PROCESS INCLUDING APPLICATION OF DYNAMIC STRESS ON THE PARTICLE SUSPENSION

Edwin Zucker, Rochester, N.Y., assignor to Xerox Corporation, Rochester, N.Y.

Original No. 3,616,391, dated Oct. 26, 1971, Ser. No. 764,720, Oct. 3, 1968. Application for reissue Sept. 27, 1973, Ser. No. 401,331
Int. Cl. B01k *51/00;* G03g *13/22*
U.S. Cl. 96—1.3 3 Claims

Matter enclosed in heavy brackets [ ] appears in the original patent but forms no part of this reissue specification; matter printed in italics indicates the additions made by reissue.

ABSTRACT OF THE DISCLOSURE

Method and apparatus for improving image density, contrast and quality and photographic speed in a photoelectrophoretic imaging system utilizing a particulate suspension for forming the image. The method and apparatus stresses an electrophoretic suspension of particles in a carrier on an electrode by applying forces across the image suspension during imaging through sliding motion between the electrodes.

This invention relates in general to photoelectrophoretic imaging and more specifically to a method and apparatus for improving quality of the images produced.

A new imaging system in which one or more types of photosensitive radiant energy absorbing particles believed to bear a charge when suspended in a nonconductive liquid carrier and placed in an electroded system and exposed to an image radiation configuration has recently been described. See U.S. Pat. No. 3,384,565, issued May 21, 1968 in the names of V. Tulagin and L. M. Carreira. The particles of this system migrate in image configuration providing a visual image at one or both of the two electrodes between which they are placed. The system employs particles which are photosensitive and which apparently undergo a net change in charge polarity upon exposure to activating radiation by interaction with one of the electrodes. No other photosensitive elements or materials are required, thereby providing a very simple and inexpensive imaging technique. Mixtures of two or more differently colored particles are used to secure various colors of images and imaging mixes having different spectral response. Particles in these mixes may have either separate or overlapping spectral response curves and may be used in subtractive color synthesis. In a monochromatic system the particles will migrate if energy of any wavelength within the panchromatic spectrum of the particle response strikes the particle.

It may be that other systems exist or will be discovered or invented that require suspensions that have some of the properties of the suspension described herein that this invention can be used thereon to improve such a system and such is contemplated herein.

It is an object of this invention to provide a method and apparatus for improving electrophoretic imaging systems.

Another object is to reduce background on photoelectrophoretically formed images. Still another object of this invention is to improve image quality in certain imaging systems.

These and other objects, features and advantages of the present invention are achieved by transversing the imaging suspension while it is under imaging conditions by an electrode and having a slight relative slipping or sliding motion between the suspension and the electrode.

Figure 1:
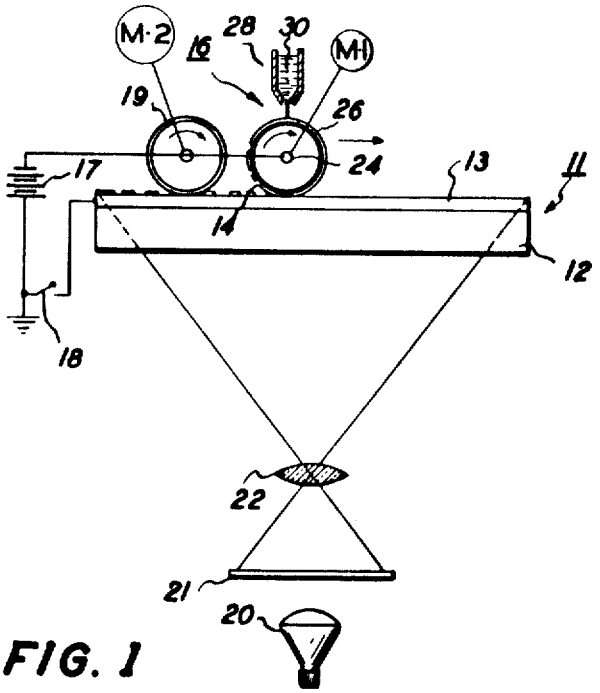
Figure 3:
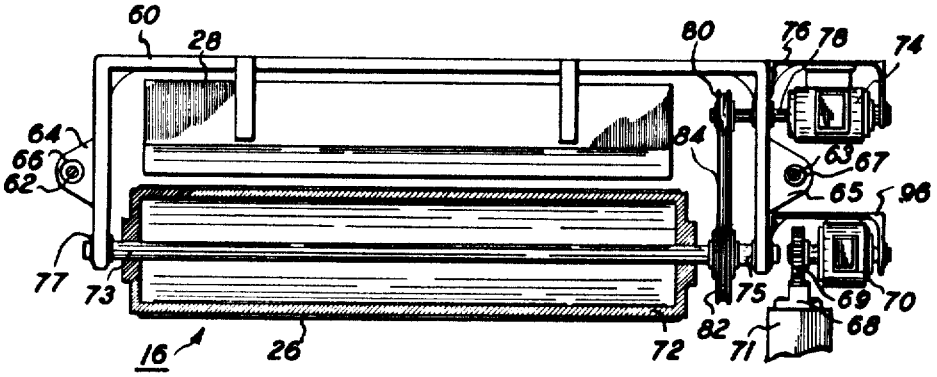
Figure 2:
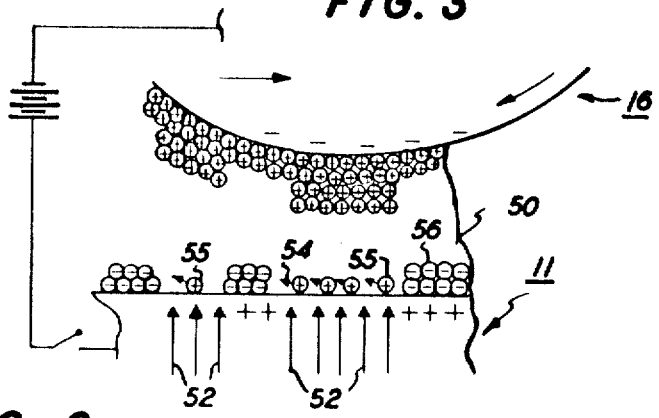

These and other objects and advantages of this invention will become apparent to those skilled in the art after reading the following description taken in conjunction with the accompanying drawings wherein:

FIG. 1 is a schematic representation of an imaging system including means for implementing the present invention;

FIG. 2 schematically illustrates the stresses in the image area effected by this invention; and, FIG. 3 shows apparatus for moving one electrode relative to another.

Referring now to FIG. 1 there is shown a transparent electrode generally designated 11 which, for illustration, is made up of a layer of optically transparent glass 12 overcoated with a thin optically transparent layer 13 of tin oxide commercially available under the name NESA glass from Pittsburgh Plate Glass Company. This electrode is referred to as the injecting or imaging electrode. To be coated on the surface of the injecting electrode 11 is a thin layer of finely divided photosensitive particles dispersed in an insulating carrier liquid hereinafter referred to as the suspension.

The term "suspension" may be defined as a system having solid particles dispersed in a solid, liquid or gas. Nevertheless, the suspensions described for illustration herein are those having a solid dispersed in a liquid carrier. The term "photosensitive" may be defined as applying to any particle which, once attracted to the injecting electrode will migrate away from it under the influence of an applied electric field when it is exposed to activating electromagnetic radiation.

Above the suspension 14 is a blocking electrode 16 which is connected to one side of a constant potential source 17 [through a switch 18]. The opposite side of the potential source 17 is connected *through a switch 18* to the injecting electrode 11 to that when the switch 18 is closed an electric field is applied across the liquid suspension 14 between the electrodes 11 and 16. An image projector made up of a light source 20, a transparency 21 and a lens 22 is provided to expose the suspension 14 to a light image of the original transparency 21 to be reproduced. The optical transparency of the electrode 11 is shown by way of example and does not affect the scope of the invention herein. Neither does the particular environment shown for imaging. Of course, this system of exposure is merely illustrative and should not be considered as limiting the invention herein.

The electrode 16, as shown, is made in the form of a roller having a conductive central core 24 connected to the potential 17. The core is covered with a layer of blocking electrode material 26 which may be Tedlar, a polyvinyl fluoride commercially available from E. I. du Pont de Nemours and Company, Inc. or other material. In this embodiment of the imaging system, the particle suspension is exposed to the image to be reproduced while a potential is applied across the blocking and injecting electrodes by closing switch 18. The blocking electrode 16 rolls across the top surface of the injecting electrode 11 with switch 18 closed during the period of image exposure. A suitable drive or motor causes this movement. The exposure causes the exposed particles originally attracted to the electrode 11 to migrate through the liquid and adhere to the surface of the electrode 16 leaving behind a particle image on the injecting electrode surface which is a duplicate of the original transparency 21.

The suspension used to form the image may be applied between the electrodes in any manner and is shown here being metered out through a dispenser represented schematically by the housing 28 with an orifice 30 through which the suspension 14 may be dispensed.

The electrode 16 is formed as a roller and traverses the electrode 11 at an imaging speed. A motor M-1 causes the roller electrode 16 to rotate at a velocity which can be set to give the surface 26 a slightly greater or a slightly lesser tangential velocity than the translational velocity of the roller across the suspension for imaging.

Alternatively, electrode 16 can rotate at a velocity providing at equal surface speed with its translation across electrode 11 and there would be no slipping between the two. Another roller 19 can be provided with a field between it and the imaging electrode 11 and roller 19 can be made to move in slipping contact with electrode 11 as it traverses electrode 11 under imaging conditions. Motor M–2 could be used to cause the speed differential for the sliding or slipping effect.

Electrode 11 is referred to as the injecting or imaging electrode and it should be understood to mean that it is an electrode which will preferably be capable of exchanging charge with the photosensitive particles of the imaging suspension 14 when the suspension is exposed to light so that a net change in the charge polarity of the particles results. The electrode 16 is refered to as the blocking electrode meaning that it has a tendency not to inject electrons into or receive electrons from the photosensitive particles of the suspension 14. Beside Tedlar, which may be used for the blocking electrode, any other suitable material having a resistivity of about $10^7$ ohms per square centimeter or greater may be employed as the blocking electrode surface material.

A wide range of voltages may be applied between the electrodes in the system. For good image resolution, high image density and low background it is preferred that the potential applied be such as to create an electric field of at least about 300 volts per mil across the imaging suspension. The applied potential necessary to attain this field strength will, of course, vary depending upon the interelectrode gap and upon the thickness and type of blocking material used on the blocking electrode surface. For the very highest image quality the optimum field is at least 2,000 volts per mil. The upper limit of the field strength is limited only by the breakdown potential of the suspension and blocking electrode material. Images produced at fields below about 300 volts per mil, are generally of low and/or low irregular density. The field utilized is calculated by dividing the potential applied between the electrodes by the interelectrode gap measurement. The field is assumed to be applied across this gap. Thus, with two electrodes spaced about 1 mil apart, a potential of about 300 volts applied between the blocking and injecting electrode surfaces will produce a field across the imaging suspension of about 300 volts per mil.

The particles within the suspension are nonconductive when not being struck with activating radiation. The negative particles come into contact with or are closely adjacent to the injecting electrode 11 and remain in that position under the influence of the applied electric field until they are subjected to exposure to activating electromagnetic radiation. The particles bound on the surface of the injecting electrode 11 make up the potential imaging particles for the final image to be reproduced thereon. When activating radiation strikes the particles, it is absorbed by the photosensitive particle and makes the particles conductive "creating" hole-electron pairs of charge carriers which may be considered mobile in nature. These newly created hole-electron pairs within the particles are thought to remain separated before they can combine due to the electrical field surrounding the particle between the two electrodes. The negative charge carriers of these hole-electron pairs move toward the positive electrode 11 while the positive charge carriers move toward the electrode 16. The negative charge carriers near the particle-electrode interface at electrode 11 can move across the very short distance between the particle and the surface 13 leaving the particle with *a* [the] net positive charge after sufficient charge transfer. These net positively charged particles are now repelled away from the positive surface of electrode 11 and attracted toward the negative blocking electrode 16. Accordingly, the particles struck by activating radiation of a wavelength with which they are sensitive, that is to say a wavelength which will cause the formation of hole-electron pairs within the particles, move away from the electron 11 to the electrode 16 leaving behind only particles which are not exposed to sufficient electromagnetic radiation in their responsive range to undergo this change.

Consequently if all the particles in the system are sensitive to one wavelength of light or another and the system is exposed to an image with that wavelength of light, a positive image will be formed on the surface of electrode 11 by the subtraction of bound particles from its surface leaving behind bound particles in unexposed areas. If all the polarities on the system are reversed, electrode 11 will preferably be capable of accepting injected holes from bound particles upon exposure to light and electrode 16 will be a blocking electrode incapable of injecting holes into the particles when they come into contact with the surface of this electrode.

Depending on the particular use to which the system is to be put, the suspension 14 may contain one, two, three or more different particles of various colors and having various ranges of spectral response. In a monochromatic system the particles included in the suspension 14 may be of any color and produce any color and the particular point or range *of* [or] spectral response is relatively immaterial as long as it shows response in some region of the spectrum which can be matched by a convenient exposure source. In polychromatic systems, the particles may be selected so that particles of different colors respond to different wavelengths in the visible spectrum thus allowing for color separation. Regardless of whether the system is employed to produce monochromatic or polychromatic images it is desirable to use particles which are relatively small in size because smaller particles produce better and more stable dispersions in the suspension and are capable of forming images of higher resolution that would be possible with particles of larger size.

When the particles are suspended in the liquid carrier, they may take on a net electrostatic charge so that they may be attracted toward one of the two imaging electrodes in the system depending on the polarity of this charge with respect to that of the electrodes. Some of the particles in the suspension may be positive, others negative and some even bipolar. The "wrong" polarity of particles of the suspensions may affect the the overall image formed by subtracting some of the particles from the system before imagewise modulation of particle migration takes place or by leaving a higher image background. In other words, the above behavior causes a portion of the suspended particles to be removed from the system as potential image-formers while others stay behind leaving a more of less uniform residue.

Further, some particles are charge injected during the imaging exposure; however, they acquire only a low positive charge. The electrical forces are too small to overcome the bonding forces such as the van der Waal's forces and the like. The forces such as shear and pressure generated by the sliding electrode will dislodge the particle and the electrical field between the electrodes can act upon the particle to make it migrate.

By electrically biasing the overdriven or underdriven roller, particles of the "wrong" polarity can be removed from the suspension or at least substantially separated from the injecting electrode 11. This would provide better, quicker, more complete and intense imaging when the electrode 16 is passed over the suspension being subjected to actinic radiation in image configuration.

Let us consider a three color subtraction system where the suspension contains individual particles of a magenta, yellow and cyan color which are sensitive to green, blue and red wavelength radiation respectively. Under optimum conditions consider that green light exposes the electroconductive glass processing the trimix (suspension with the three color particles mentioned above). The magenta particles absorb the light while the cyan and yellow particles reflect the light. The particles made conductive by absorbing the radiation exchange charge with the electroconductive glass as mentioned above. The magenta particles, as a result of their activation by exposure to the green light, become positive and migrate away from the injecting electrode. The cyan and yellow particles remain generally insulating and are not affected since they have little or no photosensitivity in the green light range of the spectrum. The magenta particles migrate selectively as made conductive to the negative blocking roller or electrode as the electrode traverses over the imaging surface. Thus a color reproduction of the original green light is obtained in image configuration on the injecting electrode by subtractive color. That is, the cyan and yellow pigments remaining appear green when viewed. This image then may be transferred using any suitable means known in the art such as that discussed in copending application Ser. No. 459,860, filed on May 28, 1965 in the name of V. Mihajlov et al. and entitled "Imaging Processor," now abandoned.

The theory of operation of the imaging and the benefits derived from overdriving or underdriving the electrode at the suspension between is illustrated in FIG. 2. Here the small circles represent greatly enlarged individual particles of pigment held in the suspension liquid 50. The large arrows 52 represent activating electromagnetic radiation which ideally causes migration of the particles from the injecting electrode. The pulses and minutes indicated within the particles represent the charge of the particle in the suspension. The small arrows, such as arrow 54, represent some component of the forces on the particle because of the action of the slightly overdriven roller-electrode 16 passing over the suspension. These forces are the result of dynamic stresses induced into the suspension by the overdriven electrode 16 and are present on all of the particles within the volume of the suspension influenced by the forces.

There is a bias placed between the two electrodes such that positively charged particles would tend to migrate to electrode 16 where they will attach themselves while negatively charged particles will tend to settle on electrode 11. When electromagnetic radiation such as that illustrated by the arrows 52 strikes the particles on the injecting electrode 11, they tend to form hole-electron pairs releasing their electron to the injecting electrode 11 and migrating, due to their positive charge, to the negatively biased electrode 16.

Some of the particles, such as particle 55, in the illuminated area do not migrate even though they have been exposed to activating radiation. These particles are of low positive charge but are held to electrode 11 by small bonding forces which in the aggregate are greater than the field force acting on the slightly positively charged particle. Nevertheless, these particles must be removed from the imaging electrode 11 in order to form a better image. The stresses on the suspension imposed by the overdriven electrode 16 are thought to act upon these slightly charged particles eventually causing them to migrate to the electrode 16. The shear and pressure forces, as well as others that may exist exert a force on the particles a component of which is shown by the arrow 54. This force acting together with the field forces overcome the small bonding forces holding these slightly charged particles to the electrode 11. Yet, they are sufficiently small so that the highly charged negative particles are not dislodged from the positively biased injecting electrode 11. Therefore, even though they may move slightly the negative particles remain on the imaging electrode 11 in image configuration while the positive particles are moved by the electrode 16 action and then attracted by the electrical bias on electrode 16. The overdriven roller stresses the particles on the electrode 11 sufficiently to overcome all forces tending to hold the particles there except the electrical biasing force of the imaging system.

FIG. 3 represents apparatus capable of providing the desired motion to the blocking electrode in moving it across the imaging electrode while it slides slightly thereon. The cylindrical electrode 16 with its blocking surface 26 is maintained in a frame 60 which also houses the suspension dispensing hopper 28 and the drive mechanisms. All of the above are mounted on the frame 60 for movement therewith during the imaging.

Two support rods 62 and 63 maintain the frame 60 and the electrode 16 in a proper position relative to the imaging electrode (not shown). The frame 60 has flanged members 64 and 65 for maintaining the frame on the support bars 62 and 63 respectively through bearings 66 and 67. The support rods function in combination with rack 68, pinion gear 69 and motor 70 to move the blocking electrode 16 across the imaging electrode while maintaining a proper relationship in spacing between the two electrodes. The rack 68 is mounted on a machine frame 71 and as the motor 70 drives the gear 69 it contacts the rack 68 pulling the entire frame 60 with all the members it houses in such a manner that it is guided by the support rods 62 and 63 along a predetermined path over the imaging electrode.

The blocking electrode is formed as a roller 72 having a central shaft 73 mounted on frame 60 through bearings 75 and 77 which are ball bearings or the like. The roller 72 is rotated at any selected speed by motor 74 suitably bracketed to the frame 60 by bracket 76. A drive shaft 78 turns a pulley 80 which rotates pulley 82 through a belt 84. The pulley 82 is intimately fastened to the roller shaft 73. Therefore, rotation of the pulley 82 causes a similar rotation of the roller 72.

The translational movement of the entire assembly over the imaging electrode is provided by support rods 62 and 63 and the motor 70 bracketed through bracket 96 to the frame 60. By rotating the gear 69 along the rack 68, the motor 70 causes the roller electrode 16 to translate across the imaging electrode while motor 74 causes independent rotation of the electrode 16 to allow for adjustable slidable or slipping contact between the surfaces of the two electrodes. The differential linear velocity at the interface of the two electrodes should be no greater than 10 percent to avoid destruction of the image by dislodging the image forming particles from the injecting electrode 11.

The power connections and the electrical biasing means necessary to accomplish the functions described herein are not shown in this figure since those skilled in the art of building devices such as this would be able to complete such details by the skill of their calling.

While this invention has been described with reference to the structures disclosed herein and while certain theories have been expressed to explain the results to be obtained, it is not confined to the details set forth; and this application is intended to cover such modifications or changes as may come within the purposes of the improvements or the scope of the following claims.

What is claimed is:

1. In a method for imaging electrophoretic particle suspensions having a first electrode adapted to support the suspension, a second electrode capable of being brought into rolling contact with the suspension such that the suspension is maintained between said electrodes, including applying an electric field across the suspension between the electrodes, and exposing the suspension to an image with activating electromagnetic radiation, the improvement including bringing the second electrode into contact with the suspension and moving one of said electrodes relative to the other at a predetermined traversing velocity, superimposing overriding forces on one of said electrodes to impart a surface speed thereon slightly different from its predetermined traversing velocity thereby imparting forces on the particles within the suspension that are less than those necessary to destroy the image formed on the first electrode and sufficient to dislodge a portion of the nonimage forming particles in the suspension, such forces being unrelated to the electrical forces between the electrodes.

2. The method of claim 1 wherein said overriding forces cause a surface speed differential between said electrodes less than 10 percent [different from] *of* the predetermined traversing velocity.

3. The method of claim 1 wherein said overriding forces include the rotating of the second electrode, the second electrode being cylindrical.

References Cited

The following references, cited by the Examiner, are of record in the patented file of this patent or the original patent.

UNITED STATES PATENTS

| | | | |
|---|---|---|---|
| 3,384,566 | 5/1968 | Clark | 96—1.3 |
| 3,427,242 | 2/1969 | Mihajlov | 96—1 PEX |
| 3,474,019 | 10/1969 | Krieger et al. | 96—1.3 |
| 3,595,772 | 7/1971 | Zucker | 96—1 PEX |

ROLAND E. MARTIN, Jr., Primary Examiner

U.S. Cl. X.R.

96—1 PE, 1.4; 204—181 PE, 289, 300